(12) United States Patent
Gudmundsson

(10) Patent No.: US 7,443,281 B2
(45) Date of Patent: Oct. 28, 2008

(54) METHOD AND SYSTEM FOR UNLOCKING OF OBJECTS

(75) Inventor: Stefan Gudmundsson, Goteborg (SE)

(73) Assignee: Volvo Teknisk Utveckline AB, Goteborg (SE)

( * ) Notice: Subject to any disclaimer, the term of this patent is extended or adjusted under 35 U.S.C. 154(b) by 527 days.

(21) Appl. No.: 10/248,695

(22) Filed: Feb. 10, 2003

(65) Prior Publication Data

US 2003/0102958 A1 Jun. 5, 2003

Related U.S. Application Data

(63) Continuation of application No. PCT/SE01/01724, filed on Aug. 9, 2001.

(30) Foreign Application Priority Data

Aug. 10, 2000 (SE) .................................. 0002901

(51) Int. Cl.
*H04Q 1/00* (2006.01)
(52) U.S. Cl. ...................... 340/5.64; 340/5.73
(58) Field of Classification Search ............... 340/5.72, 340/5.54, 5.5, 5.51, 426.3, 426.4, 5.73, 5.65
See application file for complete search history.

(56) References Cited

U.S. PATENT DOCUMENTS

| | | | | |
|---|---|---|---|---|
| 3,812,403 A | * | 5/1974 | Gartner | 340/5.54 |
| 4,197,524 A | * | 4/1980 | Salem | 340/5.51 |
| 4,721,954 A | | 1/1988 | Mauch | |
| 4,766,746 A | * | 8/1988 | Henderson et al. | 340/5.73 |
| 4,926,665 A | | 5/1990 | Stapley et al. | |
| 5,124,696 A | * | 6/1992 | Bosley | 340/5.73 |
| 6,072,402 A | | 6/2000 | Kniffin et al. | |
| 6,556,124 B1 | * | 4/2003 | Laroche | 340/5.51 |
| 6,809,630 B1 | * | 10/2004 | Dreimann et al. | 340/5.62 |

FOREIGN PATENT DOCUMENTS

| EP | 1020335 A2 | 7/2000 |
|---|---|---|
| JP | 02115480 A | 4/1990 |

* cited by examiner

*Primary Examiner*—Brian Zimmerman
(74) *Attorney, Agent, or Firm*—Novak Druce & Quigg LLP

(57) ABSTRACT

System and method for unlocking an object (20, 24, 25) for an authorized person, by transmitting an unlock signal and a device signal from a remote station (10) to the object and storing the same in a memory (125), by comparing the device signal with an input conducted by a person at the object, for verification of authorization of the person; and by unlocking the object by means of a locking unit (130) if the authorization of the person has been verified.

13 Claims, 3 Drawing Sheets

METHOD AND SYSTEM FOR UNLOCKING OF OBJECTS

CROSS REFERENCE TO RELATED APPLICATIONS

This application is a continuation patent application of International Application No. PCT/SE01/01724, filed 9 Aug. 2001 which was published in English pursuant to Article 21(2) of the Patent Cooperation Treaty, and which claims priority to Swedish Application No. 0002901-7, filed 10 Aug. 2000. Both applications are expressly incorporated herein by reference in their entireties.

BACKGROUND OF INVENTION

1. Technical Field

The invention relates to a method and system for unlocking objects like cars, airplanes, plants, houses and other similar types of vehicles and facilities.

2. Background

The operation of objects such as vehicles and buildings, and the entry or access into such objects is often restricted to authorized persons such as the owner of the object, and those persons who are exclusively authorized for other reasons. For avoiding unauthorized entry, use, operation or theft, such objects can typically be closed and/or locked with a locking/unlocking means, which is for example a key, with which entry, operation and the like can be enabled and disabled.

A common example of this type of operation is found in automobiles and similar vehicles in which a driver opens the passenger compartment of the vehicle and starts the engine using a key. If the driver looses the key, however, or forgets the key inside the car and closes the door so that it is locked there, access is no longer permitted to the car until a second or substitute key is obtained. This may impose great problems, especially if the driver is far away from home or traveling in remote areas with no nearby service facilities.

U.S. Pat. No. 6,072,402 discloses a secure entry system that makes use of radio transmissions to communicate between a central station (clearinghouse) and locks, keys and related components throughout the system. A user who seeks access to a lock establishes communication via a cellular telephone or a conventional communication link to the central station. If it is determined or verified that the user should be authorized to access the related lock, the central station RF—transmits an authorization signal to the lock or to a related key for unlocking the lock to authorize the user to access the area secured by the lock. After identifying the presence of the user at the lock, the user can unlock the lock.

SUMMARY OF INVENTION

It is an object of the invention to provide a simple and easy to implement system and method for unlocking objects such as cars, airplanes, industrial facilities such as plants, houses and other facilities, but only by an authorized user.

It is an object of the invention to provide a system and method for unlocking objects like cars, airplanes, plants, houses and other such facilities, by which these objects can be unlocked in case that the usual locking/unlocking means is not available.

It is a further object of the invention to provide a system and method for unlocking objects in case that the usual unlocking means is not available, in such a way, that only an authorized person gets access to, or can operate the object again.

BRIEF DESCRIPTION OF DRAWINGS

Further details, features and advantages become apparent from the following description of a preferred embodiment of the invention with reference to the drawings, in which the following is shown.

DETAILED DESCRIPTION

Figure 1:
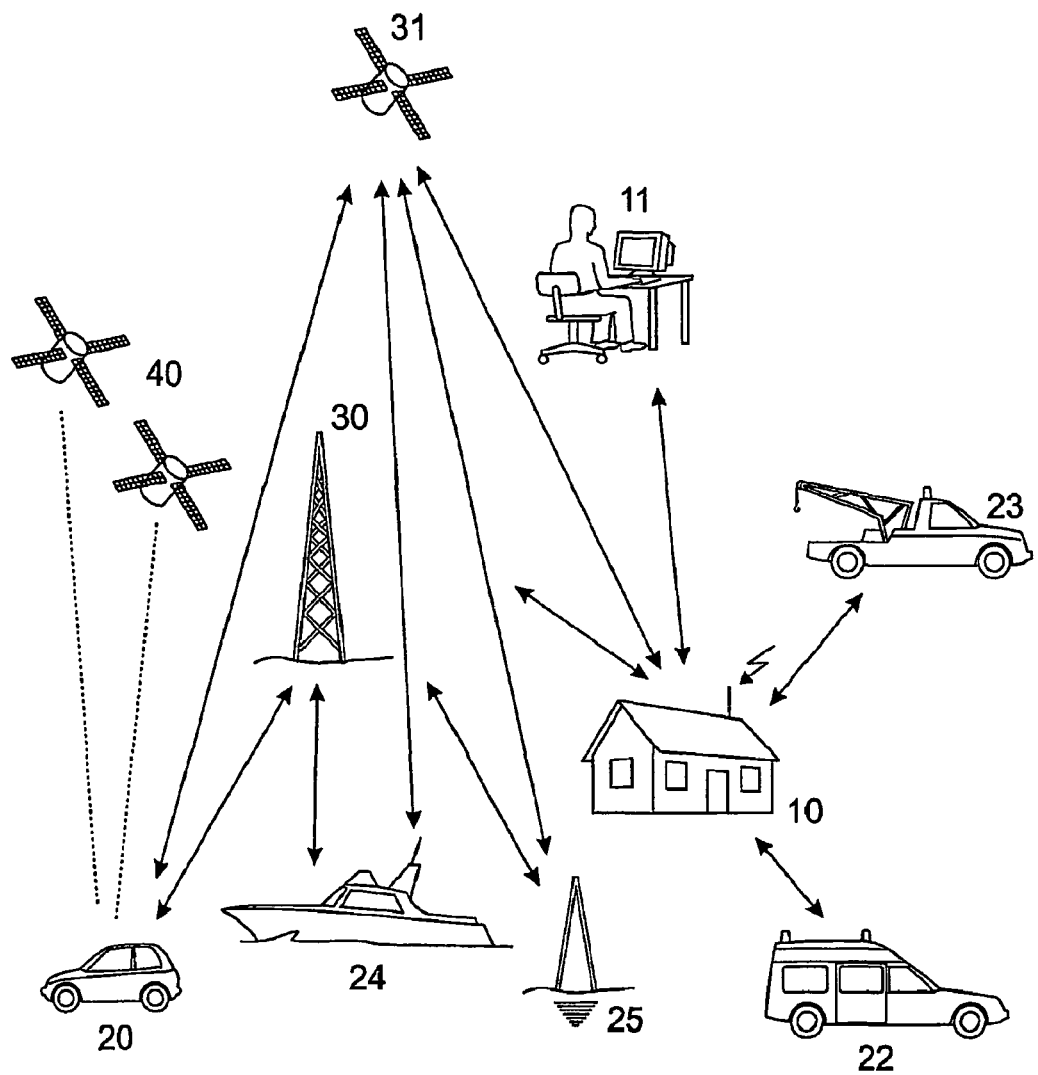
FIG. 1 is a schematic diagram or representation of the components of a system configured according to the teachings of the present invention.

The major components of a preferred embodiment of an inventive system the environment within which it operates are shown in FIG. 1. A customer service center (central station or remote station) 10 is included having an operator 11. A land vehicle 20, a boat or ship 24, as well as one or more stationary equipments 25 like a remote facility or plant are exemplarily shown communicating with the service center 10. This communication may be via a cellular communication network 30 like GSM (European standard), an AMPS (US standard) and/or a satellite communication network 31, each exemplarily used for exchanging information, data and/or voice communication in both directions (transmit and receive). Even software programs can be transmitted if necessary.

Emergency assistance vehicles 22 and a roadside assistance vehicle 23 can communicate with the service center 10 in a similar manner, or in any other ways, and are activated by the service center in case of need by one of the objects 20, 24, 25. A position of each object can be detected by means of a global positioning system (GPS) 40.

Figure 2A:
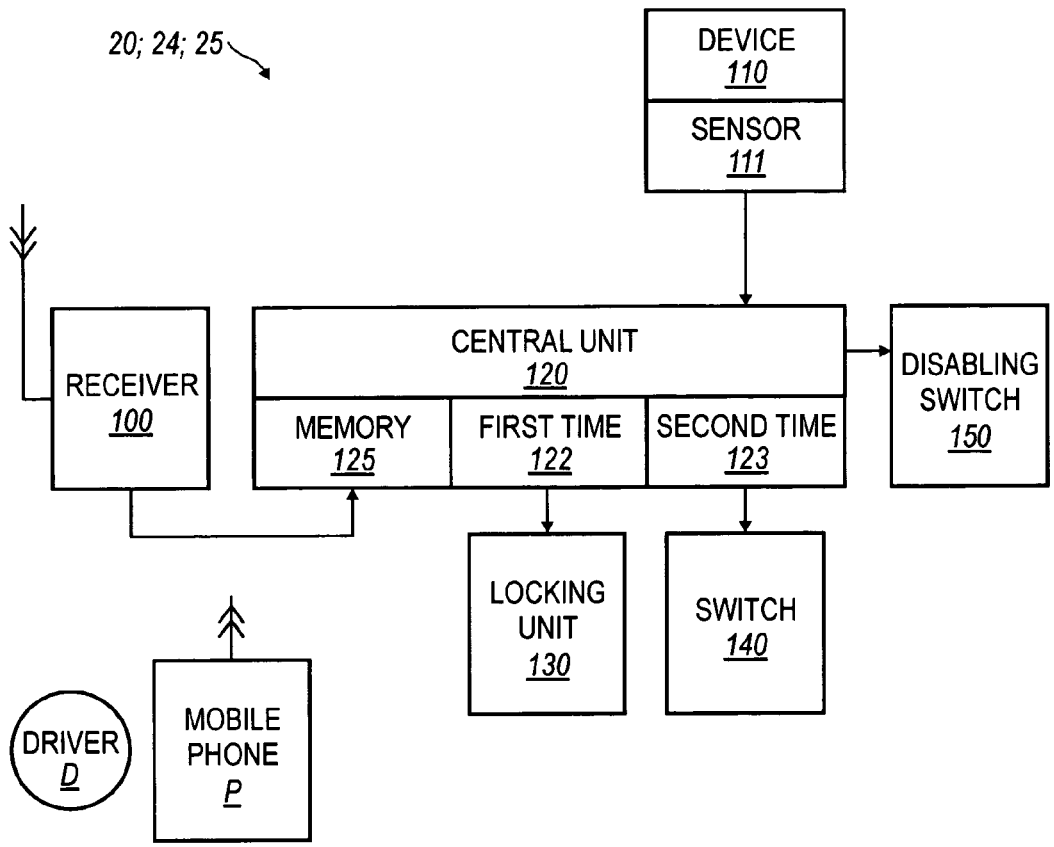
FIGS. 2a and 2b are block diagrams of performance units provided in the object and at a service station according to the teachings of the present invention.

FIG. 2a shows a block diagram of units provided to use in the accomplishment of several of the objectives of the invention(s). According to FIG. 2a, each of the objects is equipped with—an appropriate receiver unit 100 like a mobile communication unit or a satellite communication unit that is steadily installed within each object for communication with the service center.

The receiver unit 100 is connected with a control unit 120 that includes a first timer (timing circuit) 122, a second timer (timing circuit) 123 and a memory 125.

At least one device 110 that can be manually actuated is provided with a sensor 111 for detecting such actuation and the sensor 111 is connected with the control unit 120. In the case of a car, this device may be exemplified in a grip of one of the doors, the left or the right rear mirror, an antenna, a hood motor or another component.

Further, a locking unit 130 is connected with the control unit 120 for locking and unlocking a lock of the object. In the case of a car, this lock is at least one of the door locks. A switch 140 for activating the object, such as a switch for starting a motor by manually pressing a button, is as well provided and connected with the control unit 120. Finally, a disabling switch 150 for disabling activation of the object is connected with the control unit. In case of a car, this switch is connected with the control unit. Exemplarily, this switch is preferably provided for blocking the entire electronic control of the motor so that it cannot be started any more and theft of the vehicle is thereby prevented.

Figure 2B:
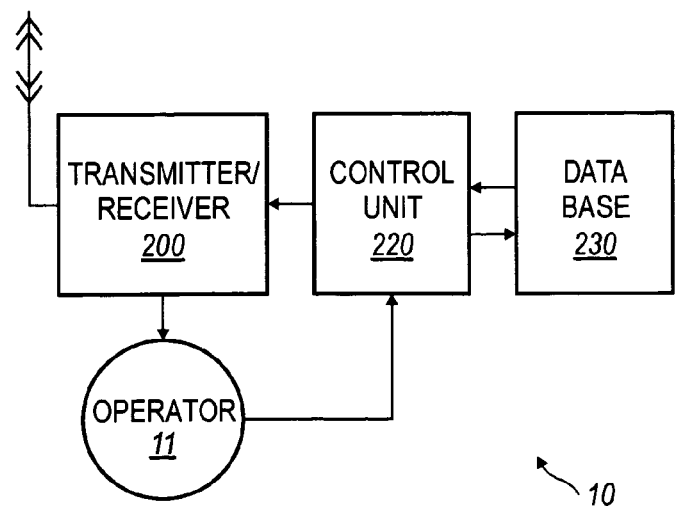

FIG. 2b shows a block diagram of the units provided in a service station or a central station (remote station) according to the invention. In FIG. 2b, such a station is equipped with a transmitter/receiver unit 200 like a mobile communication unit or a satellite communication unit for communication with each object. A control unit 220 is connected with the transmitter/receiver unit 200 and provided for generating an unlock signal, a device signal, an enable signal and a disable signal for transmitting these signals by the transmitter/receiver 200 to an object. Finally, a data base 230 is as well provided and connected with the control unit 220 for storing a personal identification code for each approved user of one of the objects.

Figure 3:
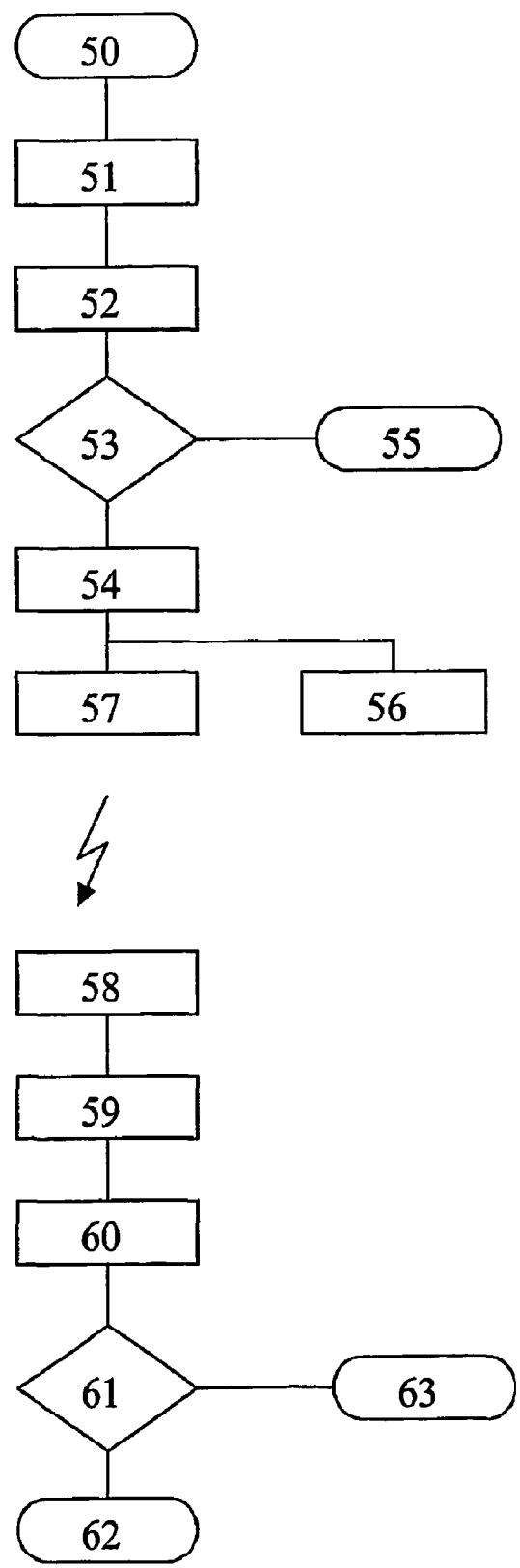
FIG. 3 is a flow chart of a method performed according to the presently disclosed invention.

FIG. 3 shows a flow chart of an inventive method for remote unlocking of such an object for an authorized person. In this example, the object is a car and the authorized person is the driver of the car.

As a starting situation 50, a driver is traveling on a long journey and decides to take a break. He leaves his car, locks the door and goes for a walk. When he returns to his car, he realizes he has left his key inside the car and is now unable to get into the car.

In a first step 51 the driver, D, takes his mobile phone, P, or goes to a public telephone box and contacts the related service center 10 or another related remote station. He requests the operator 11 to remotely unlock the door of his car. In a second step 52 the operator 11 of the service center 10 advises the driver to identify himself by transmitting his personal identification code which can be single letters, a word or a number. This code can be spoken to the operator or the driver enters the same into the keypad of the telephone so that the code is transmitted via audio frequency or a voice frequency dialing or signaling in a known manner to the service center 10.

According to step 53, the personal identification code is verified and tested. If it is valid and correct, which may be ensured by using the data base 230 that includes all customers and the associated personal identification codes, then the operator at the service center 10 transmits according to step 54 an unlock signal via the cellular communication network 30 (e.g. via SMS in the GSM-network) and/or the satellite the satellite communication network 31 to the car. Otherwise (if the identification code is invalid), the process is terminated (step 55).

Further, according to step 56, the operator instructs the driver to actuate at least one device 110 at his car (i.e. making an input at the car), for example to actuate the left and/or the right rear mirror, the antenna or the grip of one of the doors, when he is back at his car. According to step 57, the operator at the service center 10 additionally transmits at least one device signal to the car which designates and identifies each such device 110 which he told the driver to actuate.

The receiver unit 100 inside the car receives the unlock signal and the device signal and stores both of them according to step 58 in the internal memory 125 of the control unit 120. When the driver returns to his car, he actuates the designated device 110 according to the instruction of the operator (step 59). According to step 60, this actuation is detected by the sensor 111 that is associated with this device. The sensor signal is input to the control unit 120 which according to step 61 compares it with the device signal stored in the memory 125. If both signals match each other, and an unlock signal has been received from the service center, the control unit generates a first signal to the locking unit 130 for unlocking the locks of the doors of the car so that the driver now can get into his car again (step 62). If the signals do not match, the control unit 120 terminates the process without generating the first signal (step 63).

According to a second embodiment of the invention, the control unit 120 is as well provided for generating a second signal to the motor-starter switch 140 for enabling this switch for starting the motor without a key by simply pressing a button. If the driver has lost his key instead of just leaving it inside the car, he contacts the service center 10 as mentioned above and requests not only to unlock the door but also to enable the motor to be started without the key. After having identified the person as the authorized driver, the service center transmits the unlock signal and the at least one device signal for designating a device as mentioned above and further transmits the enable signal which is also stored in the memory 125 of the control unit 120. When the driver returns to his car, he actuates the designated device 110 and after receiving the sensor signal and verification, the control unit 120 generates the first and second signal. The driver can now open the door, get into his car and can start the motor by means of the switch 140 that is provided inside the car and is enabled by the second signal.

According to a third embodiment, the actuation of the designated device 110 and/or the actuation of the switch 140 for starting the motor is effective only after expiration of a predetermined first period of time after reception of the transmitted unlock signal, and, if applicable, the enable signal at the control unit 120. This time delay may be a fixed delay or the delay time is determined by the service center in dependence of the distance of the driver from his car and the time he approximately needs to return to his car. This time delay is as well transmitted from the service center to the car and evaluated by the control unit 120 which effects accordingly the first timing circuit 122 for delayed unlocking the locking unit 130 and/or the second timing circuit 123 for delayed enabling of the motor starter switch 140.

In a similar manner, according to a fourth embodiment, the actuation of the designated device 110 and/or the actuation of the motor starter switch 140 is effective only during a predetermined second period of time after reception of the transmitted unlock signal and, if applicable, the enable signal at the control unit 120. If the driver does not return to his car and actuate the designated device and, if applicable, the motor starter switch 140 before expiration of this second period of time, the control unit 120 clears the first and second timing circuits 122, 123, respectively, so that the actuation of the designated device 110 and the motor starter switch 140 has no effect and the driver has to contact the service center again and proceed as mentioned above for transmission of unlock and device signal, as well as of the motor switch enable signal, if applicable.

According to a fifth embodiment of the invention, the control unit 120 clears the first and second timing circuits 122, 123, respectively, so that the actuation of the designated device has no effect, if the driver has actuated one or two non-designated devices before.

Finally, an optional disabling unit can be activated by the control unit 120 for disabling the electronic control system of the motor so that theft is prevented. The disable unit can be activated either upon reception of the above mentioned disable signal from the service station, or for example, together with a clearing of the first and/or second timing circuit if the driver has actuated one or two non-designated devices before.

The main advantage of the inventive solution resides in the fact that a high level of security against theft and unauthorized use, operation or entry can be provided. This is achieved by transmitting the device signal, which identifies a device to be actuated and which is known only by the driver because of free designation by the service center. The security level is increased by providing the first and/or second periods of time, as well as by disabling any access according to the fifth embodiment.

If the car is provided with the switch 140 for starting the motor without a key which is normally disabled and can be enabled by the control unit 120 according to the according to the second embodiment, the inventive solution is even applicable in the case of a lost key.

The invention claimed is:

1. Method for unlocking an object for an authorized person, comprising: transmitting an unlock signal and a device signal, said device signal designating at least one of a plurality of devices at the object, the devices selected from the group consisting of a door grip, a left mirror, a right mirror, an antenna, and a hood motor at the object, from a remote station to the object and storing the same in a memory; comparing the device signal with one or more actuation inputs from at least one device conducted by a person at the object, for verification of authorization of the person; and unlocking said object by means of the unlock signal if the authorization of the person has been verified.

2. The method according to claim 1, further comprising, that, prior to transmitting the unlock signal and the device signal, a personal identification code of the person is transmitted to the remote station.

3. The method according to claim 1, wherein the device signal indicates actuation of the device, as sensed by a sensor.

4. The method according to claim 1, wherein the input is effective only after expiration of a predetermined first period of time after reception of the unlock signal from the remote station.

5. The method according to claim 1, wherein the input is effective only during a predetermined second period of time after reception of the unlock signal from the remote station.

6. The method according to claim 1, wherein the one or more activation inputs comprises a first input and second input and the second input has no effect, if authorization of the person has not been verified for the first input.

7. The method according to claim 1, wherein the object is a car and the motor is enabled to be started without a key by means of an enable signal if the authorization of the person has been verified.

8. A system for unlocking an object for an authorized person, said system comprising: a remote station (10) for transmitting an unlock signal and a device signal, said device signal designating at least one of a plurality of devices at the object, the devices selected from the group consisting of a door grip, a left mirror, a right mirror, an antenna, and a hood motor at the object, to the object; and a receiver unit and a control unit at the object for receiving and comparing the device signal with an actuation of at least one device conducted by a person at the object, for verification of authorization of the person, and for unlocking the object by means of the unlock signal if the authorization of the person has been verified.

9. The system according to claim 8, wherein the device signal is a signal which designates a device at the object and wherein a sensor means is provided for sensing actuation of the device and transmitting the sensor signal to the control unit.

10. The system according to claim 8, further comprising a first timer for providing a predetermined first period of time after reception of the unlock signal from the remote station, wherein the input is effective only after expiration of this first period of time.

11. The system according to claim 8, wherein a second timer for providing a predetermined second period of time after reception of the unlock signal from the remote station, wherein the input is effective only during this second period of time.

12. An object such as a car, airplane, plant, house or other type of facility, the operation and/or entry of which is restricted to authorized persons, said object comprising: a receiver unit for receiving a device signal, said device signal designating at least one of a plurality of devices at the object, the devices selected from the group consisting of a door grip, a left mirror, a right mirror, an antenna, and a hood motor, from a remote station and a control unit for comparing the device signal with an actuation of at least one device conducted by a person at the object, for verification of authorization of the person, and for unlocking a locking unit at the object, if the authorization of the person has been verified.

13. The method of claim 1, further comprising the step of blocking an unlock signal if a non-designated device is activated.

* * * * *